United States Patent
McMillan (10) Patent No.: US 9,294,815 B2
(45) Date of Patent: Mar. 22, 2016

(54) METHODS AND APPARATUS TO DISCRIMINATE BETWEEN LINEAR AND NON-LINEAR MEDIA

(71) Applicant: THE NIELSEN COMPANY (US), LLC, Schaumburg, IL (US)

(72) Inventor: F. Gavin McMillan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/212,646

(22) Filed: Mar. 14, 2014

(65) Prior Publication Data

US 2014/0282672 A1   Sep. 18, 2014

Related U.S. Application Data (60) Provisional application No. 61/791,481, filed on Mar. 15, 2013.

(51) Int. Cl.
| | |
|---|---|
| *H04N 21/24* | (2011.01) |
| *H04N 21/442* | (2011.01) |
| *H04N 21/439* | (2011.01) |
| *H04N 21/44* | (2011.01) |
| *H04N 21/658* | (2011.01) |

(52) U.S. Cl.
CPC ..... *H04N 21/44213* (2013.01); *H04N 21/4394* (2013.01); *H04N 21/44008* (2013.01); *H04N 21/44204* (2013.01); *H04N 21/6582* (2013.01)

(58) Field of Classification Search
CPC .............. H04N 21/2407; H04N 21/44213; H04N 21/8352; H04N 21/44008; H04N 21/234381; H04N 21/235; H04N 21/2387; H04N 21/2747; H04N 21/435; H04N 21/44222; H04N 21/25866; H04N 7/17318
USPC ..................................... 725/9–10, 14, 19, 88
See application file for complete search history.

(56) References Cited

U.S. PATENT DOCUMENTS

| | | | |
|---|---|---|---|
| 4,677,466 A | 6/1987 | Lert, Jr. et al. | |
| 5,481,294 A | 1/1996 | Thomas et al. | |
| 5,675,510 A | 10/1997 | Coffey et al. | |
| 6,272,176 B1 | 8/2001 | Srinivasan | |

(Continued)

OTHER PUBLICATIONS

Society of Cable Telecommunication Engineers, "Digital Program Insertion Splicing API," SCTE Engineering Committee, 2009 (58 pages).

(Continued)

*Primary Examiner* — Brian T Pendleton
*Assistant Examiner* — Alan Luong
(74) *Attorney, Agent, or Firm* — Hanley, Flight & Zimmerman, LLC (57) ABSTRACT

Methods and apparatus to discriminate between linear and non-linear media are disclosed An example method to determine whether a media presentation is a linear or a non-linear media presentation comprises generating a reference log comprising a first media identifier of first media and a time at which the first media was presented, accessing a media presentation log comprising a second media identifier of second media and a time at which the second media was presented, and determining whether the second media correspond to a linear media presentation or a non-linear media presentation by comparing the media presentation log to the reference log.

31 Claims, 3 Drawing Sheets

| Date and Time | Type | Media Asset Identifier | Media Offset |
|---|---|---|---|
| 11.13.12 9:00:00 - 9:10:00 | Program | P5545 | 0 |
| 11.13.12 9:10:00 - 9:10:29 | Non-program | N3523 | 0 |
| 11.13.12 9:10:30 - 9:10:59 | Non-program | N9877 | 0 |
| 11.13.12 9:11:00 - 9:11:29 | Non-program | N6545 | 0 |
| 11.13.12 9:11:30 - 9:11:59 | Non-program | N2123 | 0 |
| 11.13.12 9:12:00 - 9:21:00 | Program | P5545 | 10:01 |

Table 4: Meter 'A' Match Results for 11.13.2012 at 9pm

(56) References Cited

U.S. PATENT DOCUMENTS

| | | | |
|---|---|---|---|
| 7,460,684 B2 | 12/2008 | Srinivasan | |
| 7,609,853 B2 | 10/2009 | Ramaswamy et al. | |
| 7,623,823 B2 | 11/2009 | Zito et al. | |
| 7,643,090 B2 | 1/2010 | Ramaswamy et al. | |
| 7,647,604 B2 | 1/2010 | Ramaswamy | |
| 7,793,318 B2 | 9/2010 | Deng | |
| 7,797,186 B2 | 9/2010 | Dybus | |
| 7,882,525 B2 | 2/2011 | Haque | |
| 7,984,462 B2 | 7/2011 | Deng | |
| 8,358,966 B2 | 1/2013 | Zito et al. | |
| 8,369,972 B2 | 2/2013 | Topchy et al. | |
| 8,370,201 B2 | 2/2013 | Cansler et al. | |
| 8,600,531 B2 | 12/2013 | Topchy et al. | |
| 2003/0070167 A1 | 4/2003 | Holtz et al. | |
| 2004/0230994 A1* | 11/2004 | Urdang | H04N 7/17318 725/88 |
| 2004/0268413 A1 | 12/2004 | Reid et al. | |
| 2005/0267750 A1* | 12/2005 | Steuer | H04H 60/37 704/231 |
| 2007/0211170 A1* | 9/2007 | Ramaswamy | H04H 60/31 348/552 |
| 2007/0245243 A1* | 10/2007 | Lanza | G06F 17/30817 715/723 |
| 2007/0273754 A1 | 11/2007 | Cockerton et al. | |
| 2009/0256972 A1* | 10/2009 | Ramaswamy | G06Q 30/02 348/738 |
| 2010/0325666 A1* | 12/2010 | Wiser | H04N 7/17336 725/44 |
| 2011/0314039 A1 | 12/2011 | Zheleva et al. | |
| 2012/0004911 A1 | 1/2012 | Quan | |
| 2012/0047532 A1* | 2/2012 | McCarthy, III | H04N 5/44543 725/39 |
| 2013/0007790 A1 | 1/2013 | McMillan | |
| 2014/0259039 A1 | 9/2014 | Nielsen | |
| 2014/0282671 A1 | 9/2014 | McMillan | |

OTHER PUBLICATIONS

Society of Cable Telecommunication Engineers, "Digital Program Insertion Cueing Message for Cable," SCTE Engineering Committee, 2007 (42 pages).

Patent Cooperation Treaty, "International Search Report and Written Opinion," issued in connection with Application No. PCT/US2014/029064, Jul. 28, 2014, 12 pages.

U.S. Appl. No. 14/212,630, filed Mar. 14, 2014, 66 pages.

United States Patent and Trademark Office, "Restriction and/or Election Requirement," issued in connection with U.S. Appl. No. 14/212,630, Apr. 10, 2015, 6 pages.

* cited by examiner

| Date and Time | Type | Media Asset Identifier | Media Offset |
|---|---|---|---|
| 11.12.12 8:00:00 - 8:10:00 | Program | P1234 | 0 |
| 11.12.12 8:10:00 - 8:10:29 | Non-program | N3342 | 0 |
| 11.12.12 8:10:30 - 8:10:59 | Non-program | N3343 | 0 |
| 11.12.12 8:11:00 - 8:11:29 | Non-program | N3344 | 0 |
| 11.12.12 8:11:30 - 8:11:59 | Non-program | N3345 | 0 |
| 11.12.12 8:12:00 - 8:21:00 | Program | P1234 | 10:01 |

Table 1: Log of Program and Non-Program media for a distribution source

FIG. 1

| Date and Time | Type | Media Asset Identifier | Media Offset |
|---|---|---|---|
| 11.12.12 8:00:00 - 8:10:00 | Program | P1234 | 0 |
| 11.12.12 8:10:00 - 8:10:29 | Non-program | N3342 | 0 |
| 11.12.12 8:10:30 - 8:10:59 | Non-program | N3343 | 0 |
| 11.12.12 8:11:00 - 8:11:29 | Non-program | N3344 | 0 |
| 11.12.12 8:11:30 - 8:11:59 | Non-program | N3345 | 0 |
| 11.12.12 8:12:00 - 8:21:00 | Program | P1234 | 10:01 |

Table 2: Log of Distributor X

FIG. 2

| Date and Time | Type | Media Asset Identifier | Media Offset |
|---|---|---|---|
| 11.12.12 8:00:00 - 8:10:00 | Program | P5545 | 0 |
| 11.12.12 8:10:00 - 8:10:29 | Non-program | N3523 | 0 |
| 11.12.12 8:10:30 - 8:10:59 | Non-program | N9877 | 0 |
| 11.12.12 8:11:00 - 8:11:29 | Non-program | N6545 | 0 |
| 11.12.12 8:11:30 - 8:11:59 | Non-program | N2123 | 0 |
| 11.12.12 8:12:00 - 8:21:00 | Program | P5545 | 10:01 |

Table 3: Log of Distributor Y

FIG. 3

| Date and Time | Type | Media Asset Identifier | Media Offset |
|---|---|---|---|
| 11.13.12 9:00:00 - 9:10:00 | Program | P5545 | 0 |
| 11.13.12 9:10:00 - 9:10:29 | Non-program | N3523 | 0 |
| 11.13.12 9:10:30 - 9:10:59 | Non-program | N9877 | 0 |
| 11.13.12 9:11:00 - 9:11:29 | Non-program | N6545 | 0 |
| 11.13.12 9:11:30 - 9:11:59 | Non-program | N2123 | 0 |
| 11.13.12 9:12:00 - 9:21:00 | Program | P5545 | 10:01 |

Table 4: Meter 'A' Match Results for 11.13.2012 at 9pm

FIG. 4

| Date and Time | Type | Media Identifier | Time Offset |
|---|---|---|---|
| 11.13.12 10:00:00 - 10:35:00 | Program | P5545 | +1 2:00:00 |

Table 5: Meter 'B' Match Results for 11.13.2012 at 10pm

METHODS AND APPARATUS TO DISCRIMINATE BETWEEN LINEAR AND NON-LINEAR MEDIA

RELATED APPLICATION

This patent claims priority to U.S. Provisional Patent Application No. 61/791,481, filed Mar. 15, 2013. U.S. Provisional Patent Application No. 61/791,481 is incorporated herein by reference in its entirety.

BACKGROUND

Linear television has been the model of television distribution in the United States since the 1940's. In a linear television model, a broadcaster schedules programs to air at specific times. Consumers can obtain guides, which could be paper or electronic, to determine what program is being aired at a given time for a given source. Consumers can time shift content from a linear distribution source in a number of ways. Consumer electronic devices like VCR's and DVR's allow for the recording of a program at its scheduled time, and playback can be at the time of choosing of the consumer.

SUMMARY

Example methods disclosed herein include generating a reference log comprising a first media identifier of first media and a time at which the first media was presented, accessing a media presentation log comprising a second media identifier of second media and a time at which the second media was presented, and determining whether the second media correspond to a linear media presentation or a non-linear media presentation by comparing the media presentation log to the reference log. In some examples, the first media comprises first program media and first non-program media, and the second media comprises second program media and second non-program media.

Some example methods further include generating the media presentation log by identifying a portion of the second media as program media or non-program media and storing in the media presentation log the second media identifier, the time at which the second media was presented, and a media type indicating the second media is program media or non-program media. In some such examples, identifying the portion of the second media as program media or non-program media comprises at least one of comparing a signature of the portion of the second media to a reference signature stored in a signature database, decoding a watermark in the portion of the second media, detecting a blank frame, detecting a cue tone, or identifying a logo.

In some example methods, identifying the portion of the second media as program media or non-program media comprises identifying the portion of the second media as program media when a code present in the portion of the second media matches a reference code associated with reference program media. In some examples, identifying the portion of the second media as program media or non-program media comprises identifying the portion of the second media as program media when a signature generated based on the portion of the second media matches a reference signature associated with reference program media. In some example methods, identifying the portion of the second media as program media or non-program media comprises identifying the portion of the second media as non-program media when the portion of the second media is presented following at least one of a blank frame or a cue tone present in the second media.

Example apparatus disclosed herein include a processor and a memory comprising computer readable instructions which, when executed, cause the processor to at least: generate a reference log comprising a first media identifier of first media and a time at which the first media was presented; access a media presentation log comprising a second media identifier of second media and a time at which the second media was presented; and determine whether the second media correspond to a linear media presentation or a non-linear media presentation by comparing the media presentation log to the reference log.

In some example apparatus, the first media comprises first program media and first non-program media, and the second media comprises second program media and second non-program media. In some examples, the instructions are further to cause the processor to generate the media presentation log by identifying a portion of the second media as program media or non-program media and storing in the media presentation log the second media identifier, the time at which the second media was presented, and a media type indicating the second media is program media or non-program media. In some such examples, the instructions are further to cause the processor to identify the portion of the second media as program media or non-program media by at least one of comparing a signature of the portion of the second media to a reference signature stored in a signature database, decoding a watermark in the portion of the second media, detecting a blank frame, detecting a cue tone, or identifying a logo.

In some example apparatus, the instructions are further to cause the processor to identify the portion of the second media as program media or non-program media by identifying the portion of the second media as program media when a code present in the portion of the second media matches a reference code associated with reference program media. In some examples, the instructions are further to cause the processor to identify the portion of the second media as program media or non-program media by identifying the portion of the second media as program media when a signature generated based on the portion of the second media matches a reference signature associated with reference program media. In some example apparatus, the instructions are further to cause the processor to identify the portion of the second media as program media or non-program media by identifying the portion of the second media as non-program media when the portion of the second media is presented following at least one of a blank frame or a cue tone present in the second media.

DETAILED DESCRIPTION

Today television content distributed via non-linear models is gaining popularity. Traditional non-linear means of nonlinear content distribution have been via physical media, such as VCR tapes, Laser Discs, DVD's and Blu-Ray discs. With the acceptance of broadband Internet into homes, many new services are now available to consumers to consume non-linear content through a variety of consumer electronic devices. Services like Hulu, Netflix, and Amazon VOD to name a few offer consumers the ability to watch content at any given time. Distribution of the content is not tied to any broadcast schedule.

The primary model for monetizing television content has been and continues to be via selling commercials using linear television distribution. Today, that model still dominates with over 68 billion dollars being spent on advertising in linear television for 2011. However, media companies are now using non-linear means to distribute content, and are also monetizing such content with commercials. However, the commercials for the same episode of a program in the non-linear world are typically either not in the same order, fewer, or completely different.

Since linear and non-linear television advertising is typically different for a given episode of a program, combining program ratings or viewing numbers from linear and non-linear programs would be misleading for advertisers. Advertisers and media companies use linear television ratings in order to set rates for commercials, with the implicit assumption that certain advertiser commercials air in a given program.

Example methods and apparatus disclosed herein distinguish between linear airings of programs and non-linear exposure to and/or consumption of programs. The distinctions determined using example methods and apparatus disclosed herein can be used to correctly determine audiences for different commercial advertisements presented via linear and non-linear presentation of media.

Example media measurement platforms disclosed herein are able to differentiate between program media (e.g., content) and non-program media (e.g., commercials, promotions, public service announcements, etc.), and use such information to compare a user's exposure to and/or consumption of media to what was distributed in the linear domain. By finding and analyzing the order of the program and non-program media to a reference source, example methods and apparatus disclosed herein determine whether the media is from a linear source. If no non-program media is found, or no alignment with program and non-program media is found, the media can be considered coming from a non-linear source.

Electronic Media Measurement

Electronic media measurement (e.g., to measure what media is being presented at a measurement site) can be done in a variety of ways. Example methods and apparatus use audio based solutions such as audio fingerprints or signatures. An audio fingerprint is a measurement of a characteristic of the audio, typically audio power or volume level, at discrete points of time. Strung together, these discrete measurements make up an audio fingerprint. By monitoring a source signal coming from a television station or broadcaster and generating a reference fingerprints, and comparing the reference fingerprints to one or more fingerprint(s) generated by a meter connected to the audio of a television in a home under measurement, a determination can be made if the television is tuned to the given station.

Identification codes, such as watermarks, ancillary codes, etc. may be embedded within or otherwise transmitted with media signals. Identification codes are data that are inserted into media (e.g., audio) to uniquely identify broadcasters and/or media (e.g., content or advertisements), and/or are carried with the media for another purpose such as tuning (e.g., packet identifier headers ("PIDs") used for digital broadcasting). Codes are typically extracted using a decoding operation.

Signatures are a representation of one or more characteristic(s) of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety. Codes, metadata, signatures, etc. collected and/or generated for use in identifying media and/or a station transmitting media may be referred to generally as media monitoring data or media identifying data.

Additionally or alternatively, example methods and apparatus use audio watermarks to identify media being presented at a measurement site. Audio watermarks require the distributor of the media to process the audio portion of media through some mechanism which will insert the audio watermark. The audio watermark typically contains information which will tell the media measurement company the source or distributor of the broadcast and/or the time of encoding and/or transmission.

Differentiation of Program and Non-Program Content

Examples disclosed herein have the ability to differentiate program and non-program media. Program media is any content which is part of the program (e.g., a movie, a television show), which includes an introduction, body and credits. Non-program media includes media assets such as a commercial creative, promotion, public service announcement, and other such types of media which are not part of a television program, although they may be interleaved with the program content during broadcast or other transmission.

Differentiation with Audio Fingerprints Only

Example methods and apparatus differentiate program media from non-program media with audio fingerprint technology where such technology has a granularity sufficient to identify a commercial. Typical non-program lengths are 15, 30 and 60 seconds, with the most common being 30 seconds. If the creator of the non-program media provides either the non-program media itself for the purpose of fingerprint generation, or just the fingerprint, the fingerprints can be added in a library which then can be used to match against reference content. Non-program media can also be derived from fingerprints generated at the reference site. The derivation is done by comparing consecutive sets of fingerprints from different times (30 or 60 minute blocks) from the same distribution source, or by comparing consecutive sets of fingerprints from different distribution sources at the same or different times. When consecutive sets of fingerprint matches are found in the 15, 30 and 60 second range, these are set aside as likely non-programs. When several instances of such matching are found in different time segments and/or across different distribution sources, the non-program media has been identified and can be added to a reference library. New reference media can be matched to the library to search for previously identified non-program media.

Program media can be derived in the same manner as non-program media with some variations. Program media in total duration is typically 38 minutes for an hour show (with the remainder of non-program media), and 20 minutes for a half hour show (with the remainder of the minutes non-program media). As non-program media is removed, what remains is program media from a source signal. Program media can also be stored in a library to help in future matching operations against the reference system. In some examples, program identification is aided by using a program schedule or guide. The schedule can identify the name of the program and duration, which can be used to help segregate different programs, and episodes of programs.

An entire system can be built employing sequences of audio fingerprints as the sole mechanism for media identification. Video fingerprints can also be used in place of or in cooperation with audio fingerprints. Other technologies can also be used to assist in media identification.

Watermarks Used for Media Identification

Audio and video watermarking are other techniques that are used to perform media identification for various media assets. Audio watermarking, due to its simplicity compared to video watermarking, is more predominately used in media measurement. Audio watermarking today is used to identify the distributor of media. Audio watermarking can also be used to very precisely identify media assets such as television programs at an episode level, commercials, movies, songs, video games, and/or other assets. Some examples disclosed herein employ audio and/or video watermarking for distinguishing program from non-program media.

Other Supplementary Media Identification Techniques

Other media identification techniques can also be leveraged for this method. Distributors of media often insert a commercial with the use of one or more cue tones. Cue tones are audio tones which indicate when a commercial insertion should occur. Cue tones can be carried in the SAP (Secondary Audio Program) channel, or the primary audio channel. Programmers use a distinct sequence of cue tones to identify where ad insertions should occur. As television has moved to the digital domain, there is a specification from the Society of Cable Television Engineers (SCTE) which provides a standard for Digital Program Insertion of digital cue tones. The SCTE 30 and 35 standards provide the ability to have highly accurate insertions using a presentation time stamp (PTS). The PTS data is delivered ahead of the commercial insertion, with the precise frame-accurate insertion point in the digital stream. By decoding the digital cue tone information, some example systems disclosed herein use the information to derive when commercial or non-program media begins.

Some examples disclosed herein additionally or alternatively differentiate program from non-program media by detecting a 'fade to black' frame. A video frame consisting of a single color, usually black (although other colors can be used) is inserted by programmers to aid in commercial insertion. Detection of the fade to black frame is used in examples disclosed herein to identify likely commercials or other non-program media.

Some examples disclosed herein additionally or alternatively utilize logo detection to facilitate distinguishing program versus non-program media. Many distributors of media place a small logo on their program media. The logos are not place on commercials. By looking for logo images which do not change over several minutes, some such example systems can use such information that the media is likely program media.

Processing the Reference Media

Reference media in this context is the feed (signal) which is monitored from the media company. Media monitoring can be done from an over the air source, using cable or satellite, using the Internet, and other techniques. As the reference media is presented via an information presentation device such as a television, media identification occurs. In some such examples, it is not necessary to identify by name what any of the media is, as long as a differentiation between program and non-program media occurs (ie., as long as the processor uniquely identifies the media as one of program and non-program media). So for example, it does not need to be determined that a program segment is from a particular television program (e.g., Program X). Instead, example methods and apparatus disclosed herein determine that the media is any program segment (as opposed to not a program segment) and be able to uniquely identify the segment, who distributed the segment, and the date and time the television broadcast (telecast) occurred. Example methods and apparatus disclosed herein determine who distributed the segment and the date and time of the telecast using media monitoring such as code detection and/or signature matching.

Figure 1:
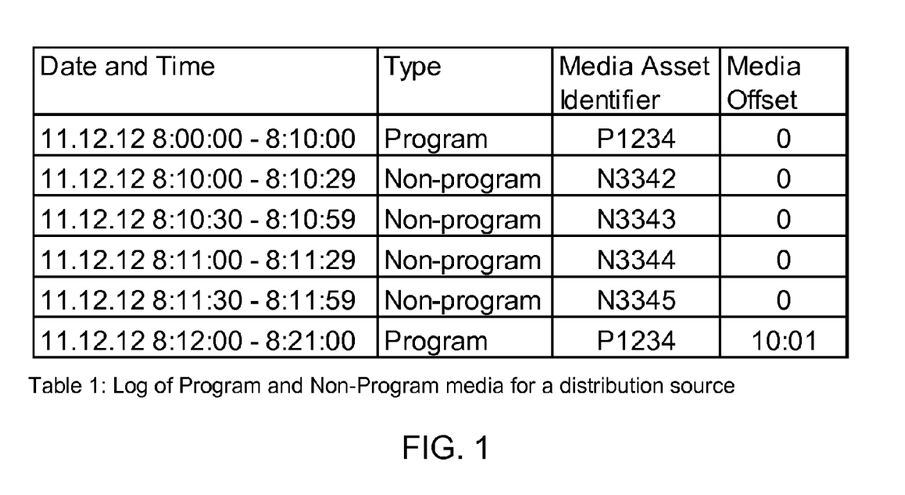
FIG. 1 is a portion of an example log for a distributor of linear media.

The reference feeds for the desired media providers are collected and processed (e.g., continually, at intervals, etc.). As the media is collected by the reference system, it is processing the ingested media continuously on a time boundary. For example, as media is collected, the media is processed by the system to determine and differentiate program versus non-program media. The result of the processing is a log with unique media asset identifiers showing program and non-program media for the given distribution source. An example of a portion of such a log for a distributor of linear media is shown in FIG. 1.

Processing Meter Data

Example methods and apparatus use media measurement meters. Meters can be hardware plus software devices, or software only where the meter software is installed typically on a consumer electronics device. The meter has the ability to collect audio fingerprints of the granularity necessary to match reference data at the individual asset level. Meters collect data, and periodically and/or aperiodically send data to a system for processing. In some examples, the meter data is matched against the reference system in an optimized way. Optimizations include only considering the distribution sources to which a home has access and/or attempting to match against live distribution sources before attempting other matching (e.g., time shifted sources). Results from the matching process are either no match, meaning there is no media exposure of interest occurring, or one or more media asset identifiers are returned in the order of detection.

By using the timestamp the meter associates with the fingerprint, live or linear sources of distribution will be considered first. If a match occurs to a live linear source, both the distributor and the media being distributed have been identified.

If there is no match in the live domain, logs for available distribution sources receivable are searched. Example methods and apparatus disclosed herein compare the media asset identifiers generated by the meter processing to the media asset identifiers in the various logs. Where matches of media asset identifiers occur, the results of the matches are passed to a rules engine. The measurement entity will determine the appropriate rules needed to classify viewing as originating from a linear source. An example of such a rule is: for any duration of metered viewing where non-program media occurs in the reference, the meter data must show that a threshold portion (e.g., eighty percent) of the non-program media was detected in the same order as detected on the reference system.

Figure 2:
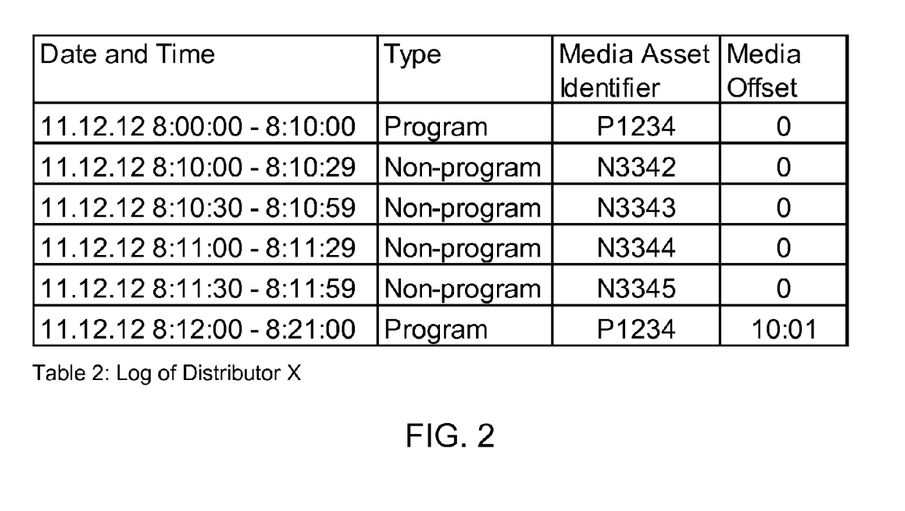
FIG. 2 is a portion of an example reference log for a first example distribution source.
Figure 3:
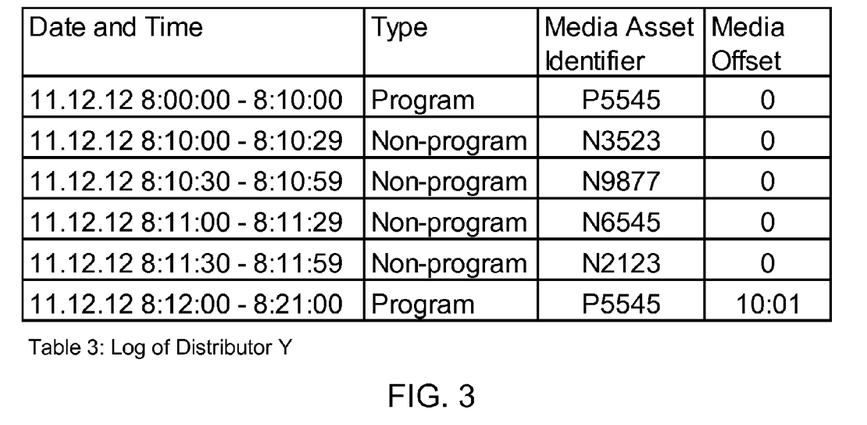
FIG. 3 is a portion of an example reference log for a second example distribution source for a same time as the reference log of FIG. 2.
Figure 4:
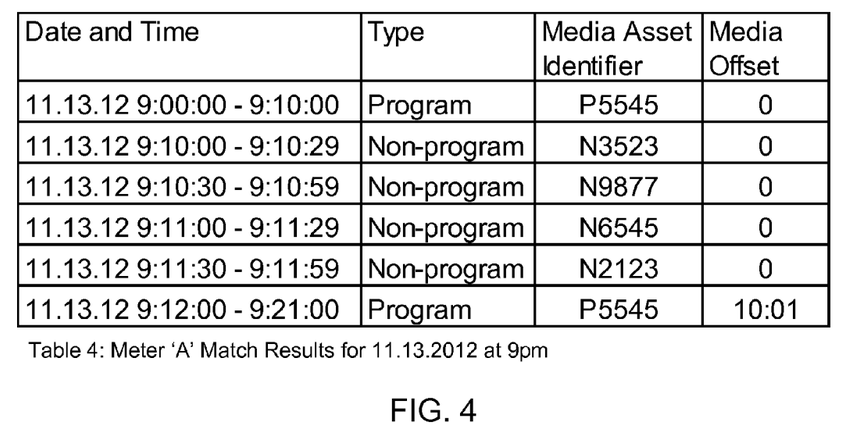
FIG. 4 shows results of example fingerprint processing of meter 'A' data against an example reference library.

FIGS. 2 and 3 below show reference logs for Nov. 12, 2012, for two different distribution sources respectively. FIG. 4 shows results of fingerprint processing of meter 'A' data against our reference library. The results of the meter match show an alignment of media asset IDs, an order of media asset IDs, and durations of media asset IDs to the distributor 'Y' reference. The results allow us to conclude this viewing was viewing to linear source distributor 'Y' in a time-shifted mode.

Figure 5:
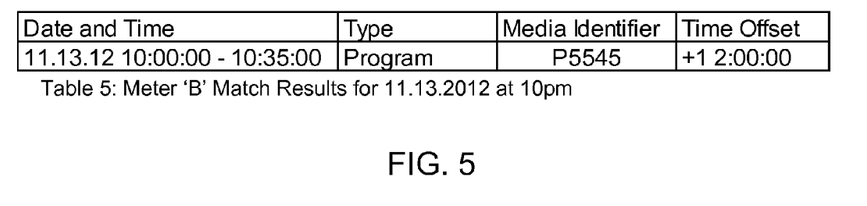
FIG. 5 shows results of example fingerprint processing of meter 'B' data against an example reference library.

Conversely, the data from meter 'B' as reflected in FIG. 5, only shows exposure to and/or consumption of program media. Based on the meter fingerprint matching data the viewing appears to be from a nonlinear source. While meter 'B' viewing could have been from a DVR as recorded linear viewing with all non-program media skipped during the viewing sessions, because no non-program, and therefore non commercial media is present, example methods and apparatus disclosed herein consider the data of FIG. 5 to represent non-linear viewing for the purpose of measuring television viewing with commercial ad exposure.

Figure 6:
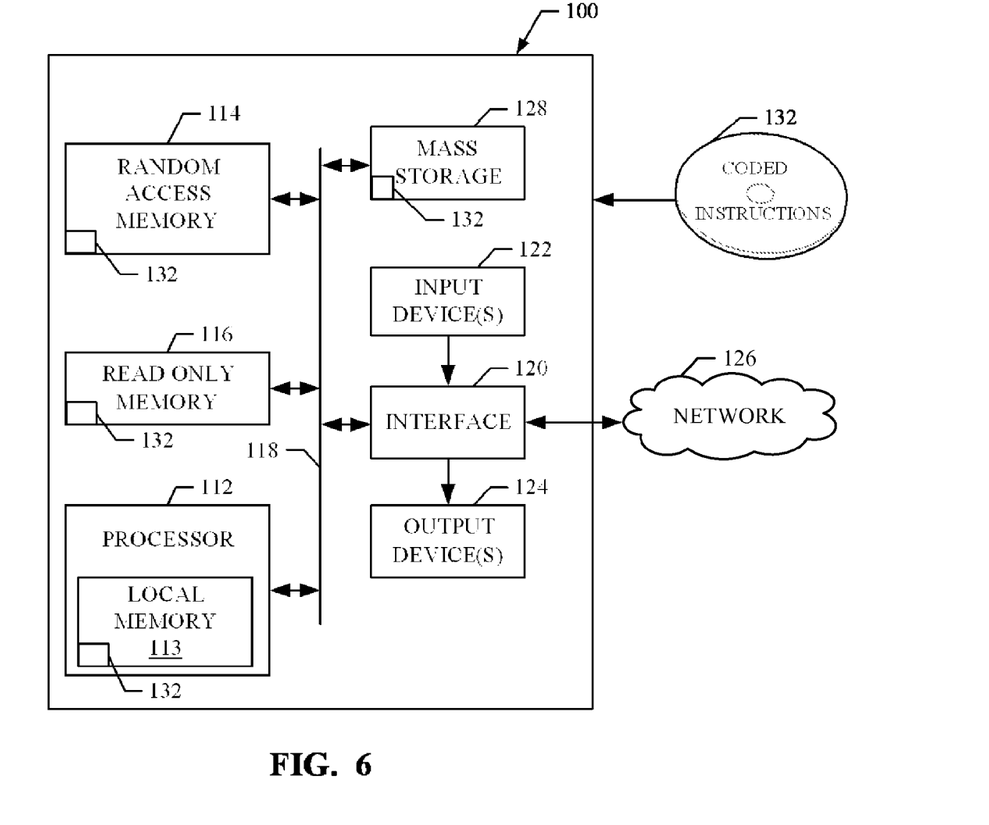
FIG. 6 is a block diagram of an example processor platform capable of implementing the example methods and apparatus disclosed herein.

FIG. 6 is a block diagram of an example processor platform 100 capable of implementing the example methods and apparatus disclosed herein. The processor platform 100 can be, for example, a server, a personal computer, a mobile device (e.g., a cell phone, a smart phone, a tablet such as an iPad™, a personal digital assistant (PDA), an Internet appliance, a digital video recorder, a gaming console, a personal video recorder, a set top box, or any other type of computing device.

The processor platform 100 of the illustrated example includes a processor 112. The processor 112 of the illustrated example is hardware. For example, the processor 112 can be implemented by one or more integrated circuits, logic circuits, microprocessors or controllers from any desired family or manufacturer.

The processor 112 of the illustrated example includes a local memory 113 (e.g., a cache). The processor 112 of the illustrated example is in communication with a main memory including a volatile memory 114 and a non-volatile memory 116 via a bus 118. The volatile memory 114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 116 may be implemented by flash memory and/or any other desired type of memory device. Access to the main memory 114, 116 is controlled by a memory controller.

The processor platform 100 of the illustrated example also includes an interface circuit 120. The interface circuit 120 may be implemented by any type of interface standard, such as an Ethernet interface, a universal serial bus (USB), and/or a PCI express interface.

In the illustrated example, one or more input devices 122 are connected to the interface circuit 120. The input device(s) 122 permit(s) a user to enter data and commands into the processor 112. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 124 are also connected to the interface circuit 120 of the illustrated example. The output devices 124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 120 of the illustrated example, thus, typically includes a graphics driver card, a graphics driver chip or a graphics driver processor.

The interface circuit 120 of the illustrated example also includes a communication device such as a transmitter, a receiver, a transceiver, a modem and/or network interface card to facilitate exchange of data with external machines (e.g., computing devices of any kind) via a network 126 (e.g., an Ethernet connection, a digital subscriber line (DSL), a telephone line, coaxial cable, a cellular telephone system, etc.).

The processor platform 100 of the illustrated example also includes one or more mass storage devices 128 for storing software and/or data. Examples of such mass storage devices 128 include floppy disk drives, hard drive disks, compact disk drives, Blu-ray disk drives, RAID systems, and digital versatile disk (DVD) drives.

The coded instructions 132 to implement the methods and apparatus disclosed herein may be stored in the mass storage device 128, in the volatile memory 114, in the non-volatile memory 116, and/or on a removable tangible computer readable storage medium such as a CD or DVD.

As used herein, the term tangible computer readable storage medium is expressly defined to include any type of computer readable storage device (e.g., a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information)) and/or storage disk and to exclude propagating signals and to exclude transmission media. As used herein, "tangible computer readable storage medium" and "tangible machine readable storage medium" are used interchangeably.

As used herein, the term non-transitory computer readable medium is expressly defined to include any type of computer readable storage device and/or storage disk (e.g., a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information)) and/or storage disk and to exclude propagating signals and to exclude transmission media. As used herein, when the phrase "at least" is used as the transition term in a preamble of a claim, it is open-ended in the same manner as the term "comprising" is open ended.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to automatically determine whether a media presentation is a linear media presentation or a non-linear media presentation, the method comprising:

generating, by executing an instruction with a processor, a reference log including first media identifiers of first media and first times at which the first media was presented as a linear media presentation;

receiving, at the processor, at least one of an audio fingerprint or a watermark code generated by a media monitoring device electronically monitoring the media presentation of second media, the audio fingerprint based on an audio characteristic of the second media electronically measured at discrete times by the media monitoring device;

identifying, by executing an instruction with the processor, second media identifiers of the second media from the at least one of the audio fingerprint or the watermark code by matching the at least one of the audio fingerprint or the watermark code to a reference audio fingerprint or a reference watermark code in a reference database;

generating, by executing an instruction with the processor, a media presentation log for the media presentation, the media presentation log including the second media identifiers of the second media and second times at which the second media was presented;

comparing, by executing an instruction with the processor, the media presentation log to the reference log to determine a number of matches between ones of the first media identifiers and ones of the second media identifiers, the matches between the ones of the first media identifiers and the ones of the second media identifiers being in a same order in the media presentation log and in the reference log; and classifying, by executing an instruction with the processor, the media presentation of the second media as a linear media presentation when the number of matches satisfies a threshold.

2. The method as defined in claim 1, wherein the first media includes first program media and first non-program media, the second media includes second program media and second non-program media, the first media identifiers identify the first program media, and the second media identifiers identify the second program media.

3. The method as defined in claim 1, further including:
generating the media presentation log by identifying a first portion of the second media as program media and a second portion of the second media as non-program media; and
storing in the media presentation log the second media identifiers, the second times at which the second media was presented, and a media type indicating whether the corresponding part of the second media is the program media or the non-program media.

4. The method as defined in claim 3, wherein the identifying of the first portion of the second media as program media includes at least one of comparing a signature of the first portion of the second media to a reference signature stored in a signature database, decoding a watermark in the first portion of the second media, detecting a blank frame, detecting a cue tone, or identifying a logo.

5. The method as defined in claim 3, wherein the identifying of the first portion of the second media as program media includes identifying the first portion of the second media as program media when a code present in the first portion of the second media matches a reference code associated with reference program media.

6. The method as defined in claim 3, wherein the identifying of the first portion of the second media as program media includes identifying the first portion of the second media as program media when a signature generated based on the portion of the second media matches a reference signature associated with reference program media.

7. The method as defined in claim 3, wherein the identifying of the portion of the second media as program media or non-program media includes identifying the portion of the second media as non-program media when the portion of the second media is presented following at least one of a blank frame or a cue tone present in the second media.

8. An apparatus to automatically determine whether a media presentation is a linear media presentation or a non-linear media presentation, the apparatus comprising:
a processor; and
a memory including computer readable instructions which, when executed, cause the processor to at least:

generate a reference log including first media identifiers of first media and first times at which the first media was presented as a linear media presentation;

receive at least one of an audio fingerprint or a watermark code generated by a media monitoring device electronically monitoring the media presentation of second media, the audio fingerprint based on an audio characteristic of the second media electronically measured at discrete times by the media monitoring device;

identify second media identifiers of the second media from the at least one of the audio fingerprint or the watermark code by matching the at least one of the audio fingerprint or the watermark code to a reference audio fingerprint or a reference watermark code in a reference database;

generate a media presentation log for the media presentation, the media presentation log including the second media identifiers of the second media and second times at which the second media was presented;

compare the media presentation log to the reference log to determine a number of matches between ones of the first media identifiers and ones of the second media identifiers, the matches between the ones of the first media identifiers and the ones of the second media identifiers being in a same order in the media presentation log and in the reference log; and classify the media presentation of the second media as a linear media presentation when the number of matches satisfies a threshold.

9. The apparatus as defined in claim 8, wherein the first media includes first program media and first non-program media, the second media includes second program media and second non-program media, the first media identifiers identify the first program media, and the second media identifiers identify the second program media.

10. The apparatus as defined in claim 8, wherein the instructions are further to cause the processor to:
generate the media presentation log by identifying a first portion of the second media as program media and a second portion of the media as non-program media; and
store in the media presentation log the second media identifiers, the second times at which the second media was presented, and a media type indicating whether the corresponding part of the second media is the program media or the non-program media.

11. The apparatus as defined in claim 10, wherein the instructions are further to cause the processor to identify the first portion of the second media as program media by at least one of comparing a signature of the first portion of the second media to a reference signature stored in a signature database, decoding a watermark in the first portion of the second media, detecting a blank frame, detecting a cue tone, or identifying a logo.

12. The apparatus as defined in claim 10, wherein the instructions are further to cause the processor to identify the first portion of the second media as program media by identifying the first portion of the second media as program media when a code present in the first portion of the second media matches a reference code associated with reference program media.

13. The apparatus as defined in claim 10, wherein the instructions are further to cause the processor to identify the first portion of the second media as program media by identifying the first portion of the second media as program media when a signature generated based on the first portion of the second media matches a reference signature associated with reference program media.

14. The apparatus as defined in claim 10, wherein the instructions are further to cause the processor to identify the second portion of the second media as non-program media by identifying the second portion of the second media as non-program media when the second portion of the second media is presented following at least one of a blank frame or a cue tone present in the second media.

15. A tangible computer readable storage medium comprising computer readable instructions which, when executed, automatically determine whether a media presentation is a linear media presentation or a non-linear media presentation by causing a processor to at least:
   generate a reference log including first media identifiers of first media and first times at which the first media was presented as a linear media presentation;
   receive at least one of an audio fingerprint or a watermark code generated by a media monitoring device electronically monitoring the media presentation of second media, the audio fingerprint based on an audio characteristic of the second media electronically measured at discrete times by the media monitoring device;
   identify second media identifiers of the second media from the at least one of the audio fingerprint or the watermark code by matching the at least one of the audio fingerprint or the watermark code to a reference audio fingerprint or a reference watermark code in a reference database;
   generate a media presentation log for the media presentation, the media presentation log including the second media identifiers of the second media and second times at which the second media was presented;
   compare the media presentation log to the reference log to determine a number of matches between ones of the first media identifiers and ones of the second media identifiers, the matches between the ones of the first media identifiers and the ones of the second media identifiers being in a same order in the media presentation log and in the reference log; and
   classify the media presentation of the second media as a linear media presentation when the number of matches satisfies a threshold.

16. The storage medium as defined in claim 15, wherein the first media includes first program media and first non-program media, the second media includes second program media and second non-program media, the first media identifiers identify the first program media, and the second media identifiers identify the second program media.

17. The storage medium as defined in claim 15, wherein the instructions are further to cause the processor to:
   generate the media presentation log by identifying a first portion of the second media as program media and a second portion of the media as non-program media; and
   store in the media presentation log the second media identifiers, the second times at which the second media was presented, and a media type indicating whether the corresponding part of the second media is the program media or the non-program media.

18. The storage medium as defined in claim 17, wherein the instructions are further to cause the processor to identify the first portion of the second media as program media by at least one of comparing a signature of the first portion of the second media to a reference signature stored in a signature database, decoding a watermark in the first portion of the second media, detecting a blank frame, detecting a cue tone, or identifying a logo.

19. The storage medium as defined in claim 17, wherein the instructions are further to cause the processor to identify the first portion of the second media as program media by identifying the first portion of the second media as program media when a code present in the first portion of the second media matches a reference code associated with reference program media.

20. The storage medium as defined in claim 17, wherein the instructions are further to cause the processor to identify the first portion of the second media as program media by identifying the first portion of the second media as program media when a signature generated based on the first portion of the second media matches a reference signature associated with reference program media.

21. The method as defined in claim 1, wherein the classifying of the media presentation of the second media includes determining whether the second media matches the first media, the first media having been presented by a television broadcaster at a scheduled time.

22. The method as defined in claim 2, wherein the first media identifiers further identify the first non-program media and the second media identifiers further identify the second non-program media.

23. The method as defined in claim 3, wherein the identifying of the second portion of the second media as non-program media includes at least one of comparing a signature of the second portion of the second media to a reference signature stored in a signature database, decoding a watermark in the second portion of the second media, detecting a blank frame, detecting a cue tone, or identifying a logo.

24. The method as defined in claim 3, wherein the identifying of the second portion of the second media as non-program media includes identifying the second portion of the second media as non-program media when a code present in the second portion of the second media matches a reference code associated with reference non-program media.

25. The method as defined in claim 3, wherein the identifying of the second portion of the second media as non-program media includes identifying the second portion of the second media as non-program media when a signature generated based on the portion of the second media matches a reference signature associated with reference non-program media.

26. The apparatus as defined in claim 10, wherein the instructions are further to cause the processor to identify the second portion of the second media as non-program media by at least one of comparing a signature of the second portion of the second media to a reference signature stored in a signature database, decoding a watermark in the second portion of the second media, detecting a blank frame, detecting a cue tone, or identifying a logo.

27. The apparatus as defined in claim 10, wherein the instructions are further to cause the processor to identify the second portion of the second media as non-program media by identifying the second portion of the second media as non-program media when a code present in the second portion of the second media matches a reference code associated with reference non-program media.

28. The apparatus as defined in claim 10, wherein the instructions are further to cause the processor to identify the second portion of the second media as non-program media by identifying the second portion of the second media as non-program media when a signature generated based on the second portion of the second media matches a reference signature associated with reference non-program media.

29. The storage medium as defined in claim 17, wherein the instructions are further to cause the processor to identify the second portion of the second media as non-program media by at least one of comparing a signature of the second portion of the second media to a reference signature stored in a signature database, decoding a watermark in the second portion of the second media, detecting a blank frame, detecting a cue tone, or identifying a logo.

30. The storage medium as defined in claim 17, wherein the instructions are further to cause the processor to identify the second portion of the second media as non-program media by identifying the second portion of the second media as non-program media when a code present in the second portion of the second media matches a reference code associated with reference non-program media.

31. The storage medium as defined in claim 17, wherein the instructions are further to cause the processor to identify the second portion of the second media as non-program media by identifying the second portion of the second media as non-program media when a signature generated based on the second portion of the second media matches a reference signature associated with reference non-program media.

* * * * *